US008700090B2

(12) United States Patent
Llanos et al.

(10) Patent No.: US 8,700,090 B2
(45) Date of Patent: Apr. 15, 2014

(54) RADIO ACCESSORY FOR A MOBILE DEVICE

(75) Inventors: Edwin Llanos, Kanata (CA); Padakandla Krishna Rao, Cupertino, CA (US); Marcelo Varanda, Ottawa (CA); Asif Hossain, Kanata (CA); Mihal Lazaridis, Waterloo (CA); Jason Griffin, Kitchener (CA); Ray Dikun, Conestogo (CA); Stewart Charles Morris, Kanata (CA); Runbo Fu, Kanata (CA); Dietmar Frank Wennemer, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1174 days.

(21) Appl. No.: 12/032,095

(22) Filed: Feb. 15, 2008

(65) Prior Publication Data

US 2008/0200208 A1   Aug. 21, 2008

Related U.S. Application Data

(60) Provisional application No. 60/890,385, filed on Feb. 16, 2007, provisional application No. 60/890,391, filed on Feb. 16, 2007.

(51) Int. Cl.
*H04B 1/38*   (2006.01)
*H04B 7/00*   (2006.01)

(52) U.S. Cl.
USPC ........................ 455/557; 455/41.2; 455/420

(58) Field of Classification Search
USPC .................... 455/41.1–41.3, 550.1–553.1, 455/556.1–558, 571–575.4, 517–519, 3.05, 455/416
See application file for complete search history.

(56) References Cited

U.S. PATENT DOCUMENTS

| 5,832,388 | A | 11/1998 | Williams et al. |
| 2002/0041175 | A1 | 4/2002 | Lauper et al. |
| 2002/0138275 | A1* | 9/2002 | Amano et al. ................. 704/270 |
| 2004/0203510 | A1* | 10/2004 | Claxton et al. ............... 455/90.3 |
| 2005/0050325 | A1* | 3/2005 | Ohkubo ......................... 713/168 |
| 2005/0079884 | A1* | 4/2005 | Lazaridis ....................... 455/517 |
| 2005/0202857 | A1 | 9/2005 | Seshadri et al. |
| 2006/0215601 | A1* | 9/2006 | Vleugels et al. .............. 370/328 |

FOREIGN PATENT DOCUMENTS

| WO | WO95/20273 | 7/1995 |
| WO | 2004/028026 | 4/2004 |

OTHER PUBLICATIONS

Sprint iDEN Digital Multi-service Data-capable Phone i580 Phone User's Guide.*
Motorola Introduces Rugged i580 iDEN Phone.*
EP08151543, European Search Report dated May 29, 2008.

* cited by examiner

*Primary Examiner* — Erika A Washington
(74) *Attorney, Agent, or Firm* — Novak Druce Connolly Bove + Quigg LLP

(57) ABSTRACT

A system for enhancing functionality of a mobile device comprising: the mobile device, wherein the mobile device includes: a radio subsystem; a processor adapted to interact with the radio subsystem; a user interface; a short range communications system; and a battery adapted to power the mobile device; and an accessory adapted to communicate with the mobile device, the accessory including: at least one processor; a radio subsystem communicating with the processor; and a short range communications system adapted to communicate with the short range communications system of the mobile device, wherein the radio subsystem of the mobile device differs from the radio subsystem of the accessory.

18 Claims, 15 Drawing Sheets

RADIO ACCESSORY FOR A MOBILE DEVICE

RELATED APPLICATION

This application claims the benefit of U.S. Provisional Application Ser. No. 60/890,385 filed on Feb. 16, 2007 and U.S. Provisional Application Ser. No. 60/890,391 filed on Feb. 16, 2007 both of which are incorporated herein by reference in their entirety.

FIELD OF THE DISCLOSURE

The present disclosure relates to an accessory for a mobile device, and in particular to an accessory have communications capabilities.

BACKGROUND

Mobile devices are generally utilized for various purposes and the functionality required by the mobile device will vary from user-to-user. A user will typically purchase a mobile device that meets his or her requirements. For example, a device may have capabilities for voice and data or for one or the other.

A device is, however, limited to the radio system that it is preconfigured with. Thus, if a user's requirements change over time, the user is forced to purchase a new mobile device.

BRIEF DESCRIPTION OF THE DRAWINGS

The present description will be better understood with reference to the drawings in which.

DETAILED DESCRIPTION

A radio accessory can take one of several forms. These include, but are not limited to, a stand-alone accessory that has various functionality built into it, or a backpack accessory that connects to the mobile device either physically or through a radio link. For the backpack accessory two options exist. A first is to share the battery with the mobile device, and the second is to have the backpack accessory have its own battery. This allows for the backpack accessory to be removed from the mobile device, for example, as a holster. Each is discussed below. As used herein, a backpack accessory is an accessory that has no user interface or a limited user interface, and requires the master mobile device to function. A stand-alone accessory can be used on its own or paired with the mobile device in a master/slave configuration. Further, the use of the term "accessory" alone or the term "radio accessory" is meant to cover both a stand-alone and a backpack accessory.

The present disclosure provides a system for enhancing functionality of a mobile device comprising: the mobile device, wherein the mobile device includes: a radio subsystem; a processor adapted to interact with the radio subsystem; a user interface; a short range communications system; and a battery adapted to power the mobile device; and a radio accessory adapted to be paired with and communicate with the mobile device, the radio accessory including: at least one processor; a radio subsystem communicating with the processor; and a short range communications system adapted to communicate with the short range communications system of the mobile device, wherein the radio subsystem of the mobile device differs from the radio subsystem of the accessory.

The present disclosure further provides a method of pairing a mobile device with a radio accessory, the mobile device and radio accessory each having a radio subsystem and a short range communications system, comprising: establishing communication between the radio accessory and the mobile device utilizing the short range communications subsystem, said establishing step utilizing a pre-established protocol for the short range communication; passing control information between the radio accessory and the mobile device; and parsing the control information at the mobile device, wherein said control information includes a call status for the radio accessory.

Figure 1:
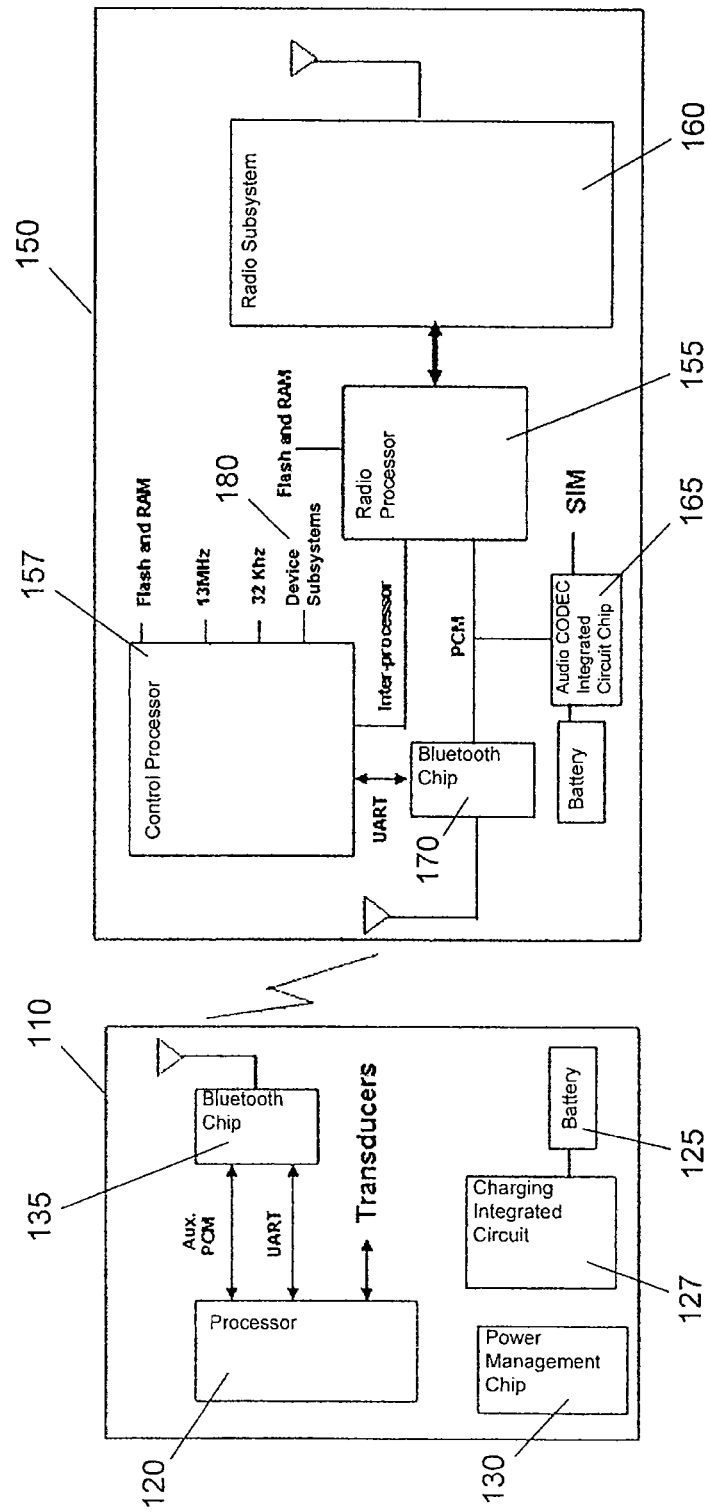
FIG. 1 is a block diagram illustrating an exemplary mobile device and stand-alone accessory.

Reference is now made to FIG. 1. FIG. 1 illustrates a block diagram of an exemplary accessory that can be connected to a mobile device. The accessory of FIG. 1 is a stand-alone accessory.

A simplified mobile device 110 is illustrated in FIG. 1. Simplified mobile device 110 includes a processor 120. Processor 120 controls the overall operation of mobile device 110. Processor 120 interacts with various system components, including a communications subsystem, device subsystems including a display, memory, input/output subsystems, serial ports, keyboards or keypads, speakers, microphones, among others (not shown). In one embodiment, processor 120 is a QUALCOMM™ MSM6500® chipset for CDMA 2000 and GSM/GPRS networks. Other processors 120 will, however, be known to those skilled in the art.

Mobile device 110 is powered by a battery 125, the charging of which is controlled by a charging integrated circuit 127. One such charging integrated circuit 127 could be the bqTINy™ integrated circuit manufactured by Texas Instruments™. Other charging integrated circuits would be known to those skilled in the art.

A power management chip 130, controls power to the various elements on mobile device 110.

A Bluetooth chip 135 communicates with processor 120 through either a universal asynchronous receiver/transmitter (UART) or an auxiliary pulse code modulation (PCM) interface. Bluetooth™ chip 135 is, for example, a Cambridge silicone radio (CSR) chipset, but other chipsets could be used.

As will be appreciated by those skilled in the art, other short range wired or wireless communications options could be utilized besides Bluetooth™ chip 135.

A stand-alone accessory 150, in a preferred embodiment, includes both a radio processor 155 and a control processor 157. Each of radio processor 155 and control processor 157 communicate with memory such as a flash and random access memory on stand-alone accessory 150. Communications between radio processor 155 and control processor 157 is accomplished through inter processor communications. Control processor 157 and radio processor 155 could alternatively be a single processor performing both operations.

Radio processor 155 further communicates with a radio subsystem 160. In one embodiment, radio subsystem 160 is an integrated digital enhanced network (iDEN) radio subsystem. Such radio subsystem could, for example, be used for low latency push-to-talk (PTT). Other radio subsystems could, however, be used and the present disclosure is not meant to be limited to iDEN radio subsystems.

An audio CODEC integrated circuit chip 165 communicates with radio processor 155 and provides a variety of functionality including a voice CODEC, as well as a multiplexer and amplifier all built into the same chip.

Audio CODEC integrated circuit chip 165 and radio processor 155 communicate with a Bluetooth™ chip 170 or other similar short range communications means.

In a one embodiment, control processor 157 further communicates with various subsystems on stand-alone accessory 150. Such subsystems include, but are not limited to, a display, memory, input/output subsystems such as a push-to-talk button, serial ports, speakers, microphones among others. These are generally shown as a link to device subsystems 180.

Figure 2:
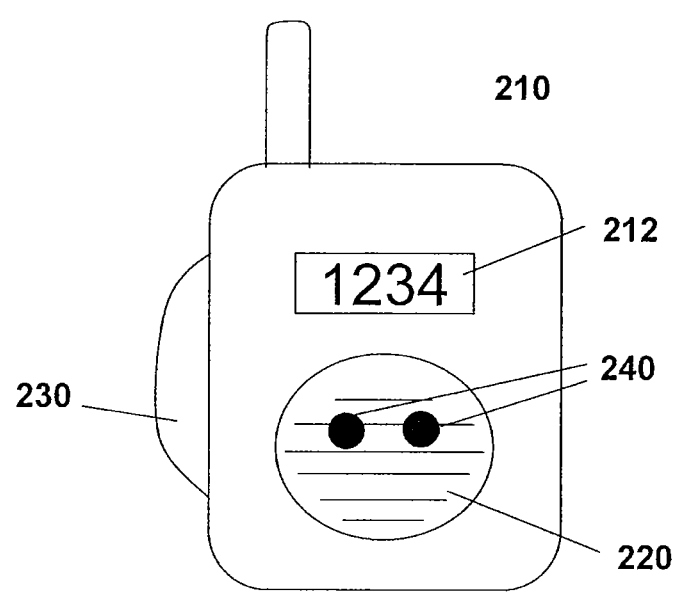
FIG. 2 is a front elevational view of an exemplary stand-alone accessory.

An exemplary stand-alone accessory is illustrated in FIG. 2. FIG. 2 shows accessory 210 includes a display 212. Further, a speaker/microphone 220 is included on device 210.

A push-to-talk button 230 is included for the exemplary device. Further, a group button 240 is provided.

As will be appreciated by those skilled in the art, accessory 210 is merely exemplary, and other accessories could be used with the present methods and systems. These other accessories, could, in some embodiments have different user interfaces from that described with reference to FIG. 2.

Referring to FIGS. 1 and 2, an exemplary device could be an iDEN push-to-talk device which communicates through the Bluetooth™ link to the mobile device. This could, for example, be a lapel mike or other stand-alone product.

The use of a stand-alone device allows for the device to be adapted more readily for the purposes that it will be used for. For example, the device could be waterproofed and "rugadized" to provide for working in adverse conditions. Thus, as will be appreciated by those skilled in the art, the push-to-talk which would be exposed to the elements could be better suited to the elements while the mobile device that it is connected to could be more protected.

The use of a stand-alone device having a Bluetooth™ connection with a mobile device allows for the seamless sharing of information through Bluetooth™. A small display could be provided in one embodiment to show who you are calling. In other embodiments, larger displays or no display might be provided, depending on user and application requirements.

As will further be appreciated, the device does not necessarily need to be an iDEN device and may have family radio services (FRS) either alone or in combination with the iDEN push-to-talk device.

As will be appreciated, the lapel accessory may also have other features, such as a global positioning system, a dual global positioning system with the mobile device, e911 consideration, among others.

Figure 3:
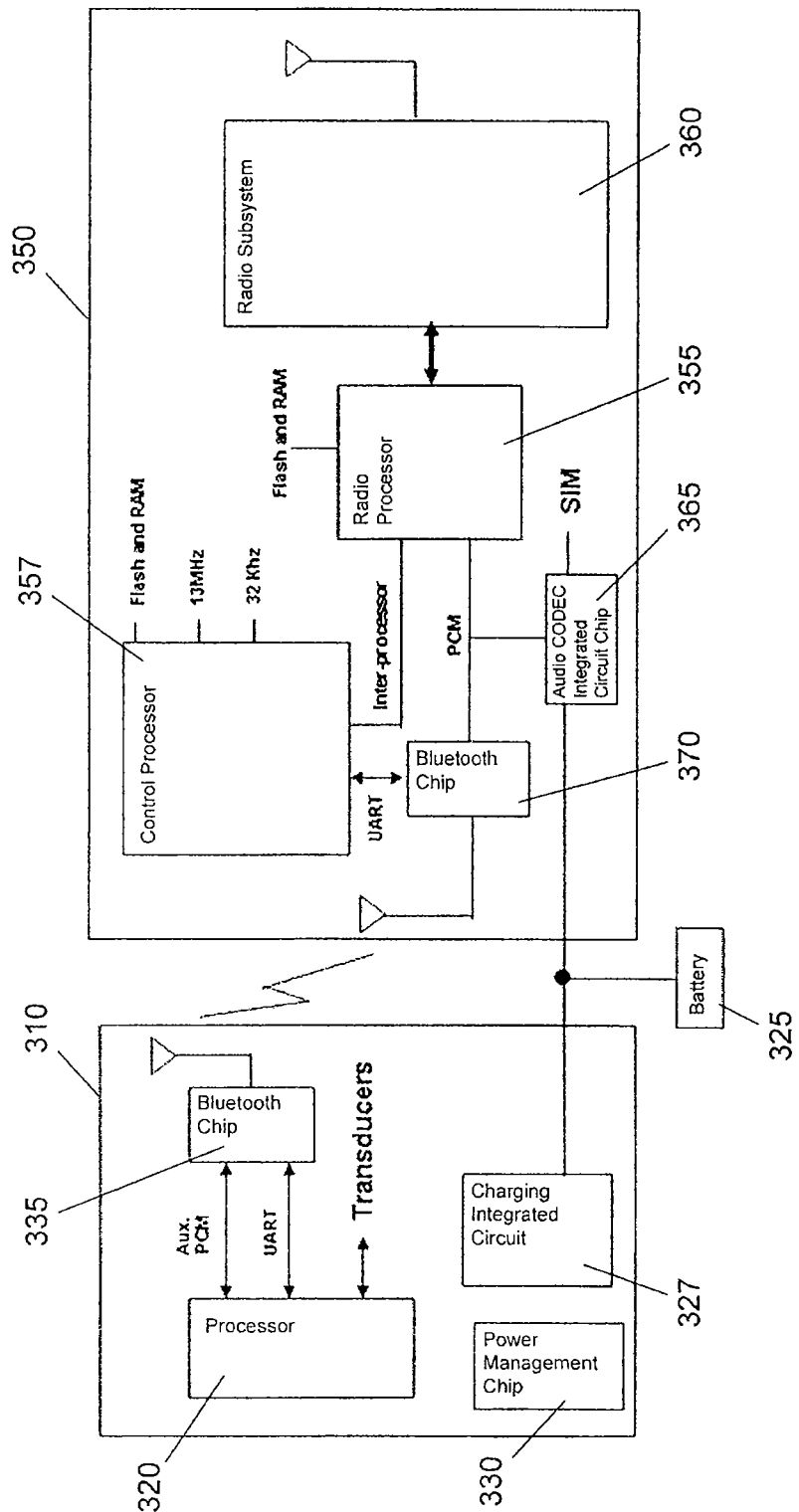
FIG. 3 is a schematic diagram showing an exemplary mobile device and a backpack accessory sharing a battery.

Reference is now made to FIG. 3. FIG. 3 illustrates a block diagram of an exemplary backpack accessory connected to a mobile device.

A simplified mobile device 310 is illustrated in FIG. 3. Simplified mobile device 310 includes a processor 320. Processor 320 controls the overall operation of mobile device 310. Processor 320 interacts with various system components, including a communications subsystem (not shown), device subsystems including a display, memory, input/output subsystems, serial ports, keyboards or keypads, speakers, microphones, among others. In one embodiment, processor 320 is a QUALCOMM™ MSM6500® chipset for CDMA 2000 and GSM/GPRS networks. Other processors 320 will, however, be known to those skilled in the art.

Mobile device 310 is powered by a battery 325, the charging of which is controlled by a charging integrated circuit 327. One such charging integrated circuit 327 could be the bqTINY™ integrated circuit manufactured by Texas Instruments™. Other charging integrated circuits would be known to those skilled in the art.

A power management chip 330 controls power to the various elements on mobile device 310.

A short range wireless communications means such as a Bluetooth chip 335 communicates with processor 320 through either a universal asynchronous receiver/transmitter (UART) or an auxiliary pulse code modulation (PCM) interface. Bluetooth™ chip 335 is, for example, a Cambridge silicone radio (CSR) chipset, but other chipsets or short range communications techniques could be used.

In the exemplary embodiment of FIG. 3, the backpack accessory 350 utilizes the same battery 325 as mobile device 310. In this case, the auxiliary backpack does not require its own battery or battery management and charging circuitry. Changing integrated circuit 327 and power management chip 330 would, however, be required to account for the power usage of backpack accessory 350.

Auxiliary backpack 350, in a preferred embodiment, includes both a radio processor 355 and a control processor 357. Each of radio processor 355 and control processor 357 communicate with memory such as flash and random access memory on backpack accessory 350. Communications between radio processor 355 and control processor 357 is accomplished, for example, through inter processor communications.

Radio processor 355 further communicates with a radio subsystem 360. In one embodiment, radio subsystem 360 is an integrated digital enhanced network (iDEN) radio subsystem. Such radio subsystem could, for example, be used for low latency push-to-talk (PTT). Other radio subsystems could, however, be used and the present disclosure is not meant to be limited to iDEN radio subsystems.

An audio CODEC integrated circuit chip 365 communicates with radio processor 355 and provides a variety of functionality including a voice CODEC, as well as a multiplexer and amplifier all built into the same chip.

Audio CODEC integrated circuit chip 365 and radio processor 355 communicate with a Bluetooth™ chip 370 in one embodiment. In other embodiments, other short range communications techniques, such as IrDA, USB, serial interface, or a proprietary interface connection could be used. The use of Bluetooth™ in the present disclosure is not meant to be limiting, but will be used for illustrative purposes throughout the disclosure.

In operation in one embodiment, a Bluetooth™ connection exists for communications between mobile device 310 and backpack accessory 350, thereby providing for voice and data transfer between mobile device 310 and backpack accessory 350. This communication is illustrated in more detail below. Further, control information to establish the pairing between the backpack accessory 350 and the mobile device 310 is passed using the Bluetooth™ connection.

Figure 4:
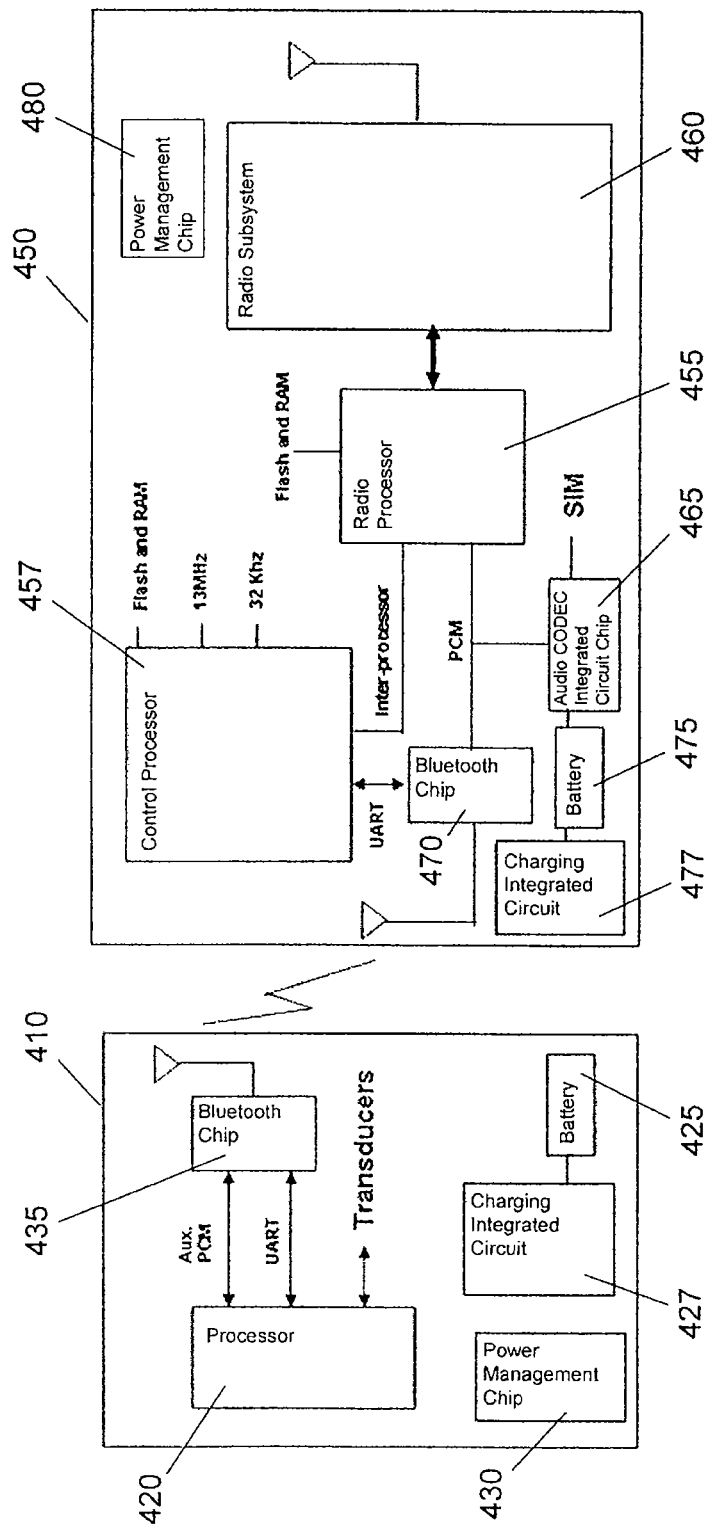
FIG. 4 is a schematic diagram showing an exemplary mobile device and backpack accessory, each having a separate battery.

Reference is now made to FIG. 4. FIG. 4 shows an alternative embodiment of a mobile device 410 and a backpack accessory 450 in which backpack accessory 450 includes a built-in battery.

As with the mobile device 310 of FIG. 3, mobile device 410 includes a processor 420. A battery 425 is included within mobile device 410 and is controlled through a charging integrated circuit 427. Power management on mobile device 410 is accomplished through power management chip 430.

Mobile device 410 further includes short range communications such as a Bluetooth™ chip 435 which allows Bluetooth™ communication to and from mobile device 410.

Backpack accessory 450 includes a radio processor 455 and a control processor 457. Further, a radio subsystem 460 is incorporated into backpack accessory 450.

An audio CODEC integrated circuit chip 465 performs the same functionality to the corresponding audio CODEC integrated circuit chip 365 of FIG. 3. Further, short range communications means such as a Bluetooth™ chip 470 is included for Bluetooth™ communications.

Backpack accessory 450 further includes a built-in battery 475 and a charging integrated circuit 477 and power management chip 480 are included within backpack accessory 450.

As will be appreciated by those skilled in the art, the embodiment of FIG. 3 could be a backpack accessory that attaches to the device itself and thus shares battery 325. Such a device could, for example, fit within a battery well of a present device and include a separate back cover for the device to accommodate the backpack accessory.

The embodiment of FIG. 4 includes a backpack accessory that includes its own battery. Such a system could, for example, be an accessory that is in close proximity to the mobile device 410. One example includes a holster that is typically used to store the mobile device 410 when not in use. The holster could include the backpack accessory 450 built into it. In other embodiments the accessory of FIG. 4 could be a lapel accessory or similar accessory.

Figure 5:
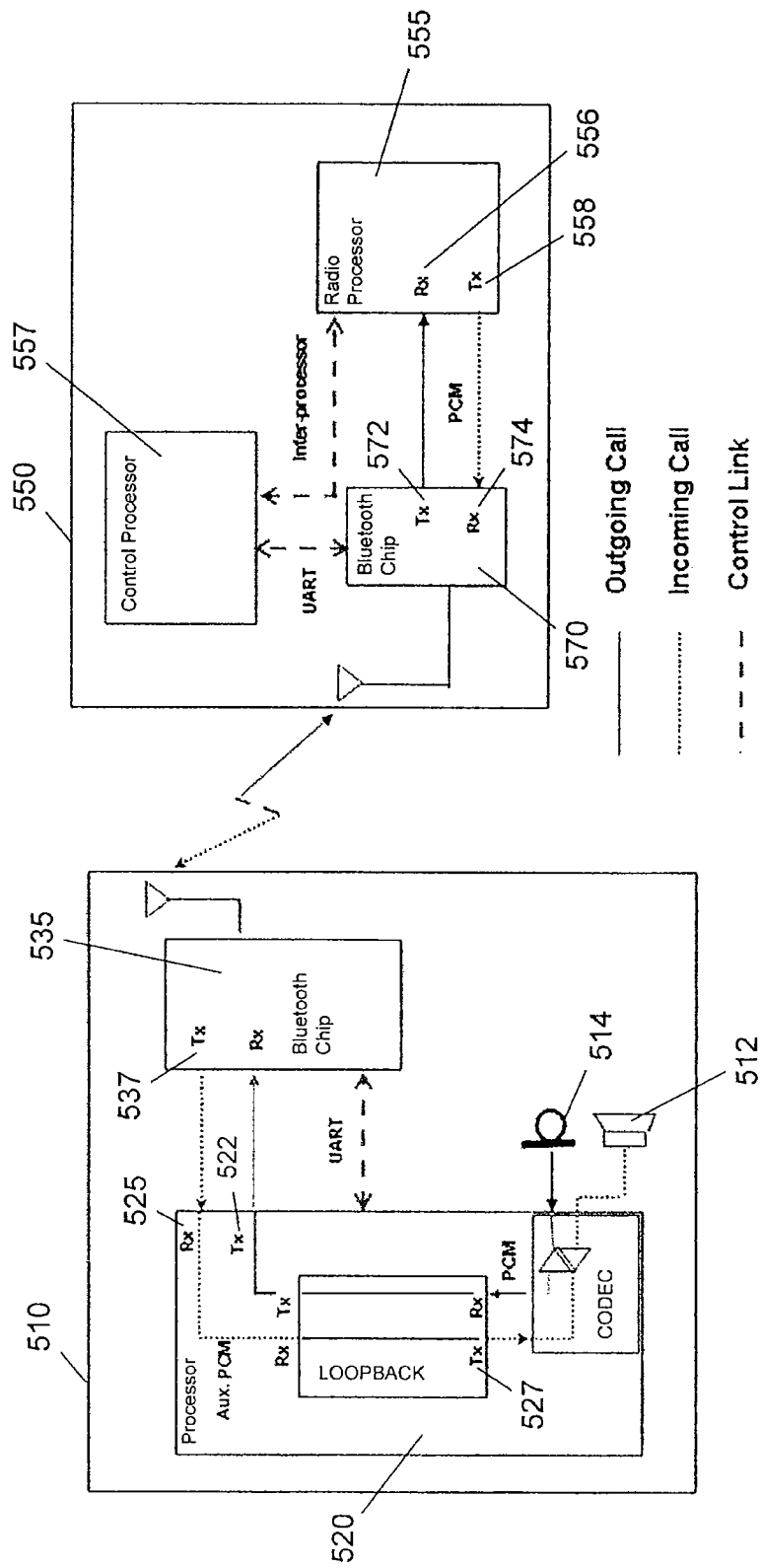
FIG. 5 is a block diagram showing an audio path between an accessory and a mobile device.

Reference is now made to FIG. 5. FIG. 5 illustrates an audio path between a backpack accessory 550 and a mobile device 510. The description of FIG. 5 relates to a Push-to-Talk device. However, this is not meant to be limiting. An outgoing voice path includes a user pushing a push-to-talk button on mobile device 510. Further, control information is sent to control processor 557 through the Bluetooth™ connection utilizing Bluetooth™ chips 535 and 570 respectively. As will be appreciated by those skilled in the art, such control information could include a Bluetooth or other short range communications protocol. This use of a protocol could define the control information required for the particular radio accessory 550 and could define communications that would then be passed by the mobile device 510 or radio accessory 550. Such control information could then be used to indicate the start of a call, end of a call, incoming call, call dropped, or other usage of the radio on either mobile device 510 or radio accessory 550. Logic on mobile device 510 could then be utilized to determine which audio path should take precedent and to determine call state. Control information could further be used to indicate information about radio accessory 550 through a user interface on mobile device 510. Control information could provide battery management when radio accessory 550 is a backpack accessory.

For example, upon receipt of the control information by the control processor 557, control processor 557 communicates with radio processor 555 to set up a call.

In a preferred embodiment, a chirp is played on mobile device 510's speaker 512 once a talk channel has been granted by the network. If resources are not allocated or the far end party is unavailable, a bonk tone is played on the speaker 512 of mobile device 510.

Once a user speaks, the voice will be picked up by a microphone 514 and the voice is sent to the internal pulse control modulation receive of processor 520.

The internal pulse code control modulation receive performs data loopback to the auxiliary PCM transmit 522 of processor 520.

The auxiliary PCM transmit of processor 520 communicates with the Bluetooth™ chip 535, and specifically with the PCM receive of Bluetooth™ chip 535.

The Bluetooth™ chip 535 sets up a synchronous connection oriented link (SCO) for a voice connection from mobile device 510 to radio accessory 550. In addition, a new Bluetooth™ audio link similar to SCO but applicable for half-duplex voice service is possible, which saves battery as opposed to using a regular SCO link (meant for full duplex audio).

From the radio accessory 550, Bluetooth™ chip 570 utilizes a PCM transmit 572 to radio processor 555 PCM receive 556. As will be appreciated, radio processor 555 can then utilize a radio resource (not shown) to transmit the voice.

For an incoming call, the radio processor 555 informs control processor 557 of an incoming call. The control processor communicates with mobile device 510, and specifically with processor 520 of mobile device 510 through a Bluetooth™ control data link. In a preferred embodiment, a chirp is played on mobile device 510 utilizing speaker 512.

Voice data sent from radio processor 555's PCM transmit 558, is received on the PCM receive 574 of Bluetooth™ chip 570.

Bluetooth™ chip 570 sets up a SCO link for voice connection from backpack accessory 550 to mobile device 510.

Voice data from the mobile device's Bluetooth™ chip 535 PCM transmit 537 is sent to processor 520 auxiliary PCM receive 525.

The processor 520 auxiliary PCM receive 525 loops back to an internal PCM transmit 527. The internal PCM transmit then transmits to speaker 512.

As will be appreciated, in alternative embodiments, radio accessory 550 can have its own microphone and speaker. In this case, control signals from control processor 557 can override speaker 512 and microphone 514 in favor of a microphone and speaker (not shown) on radio accessory 550

Figure 6:
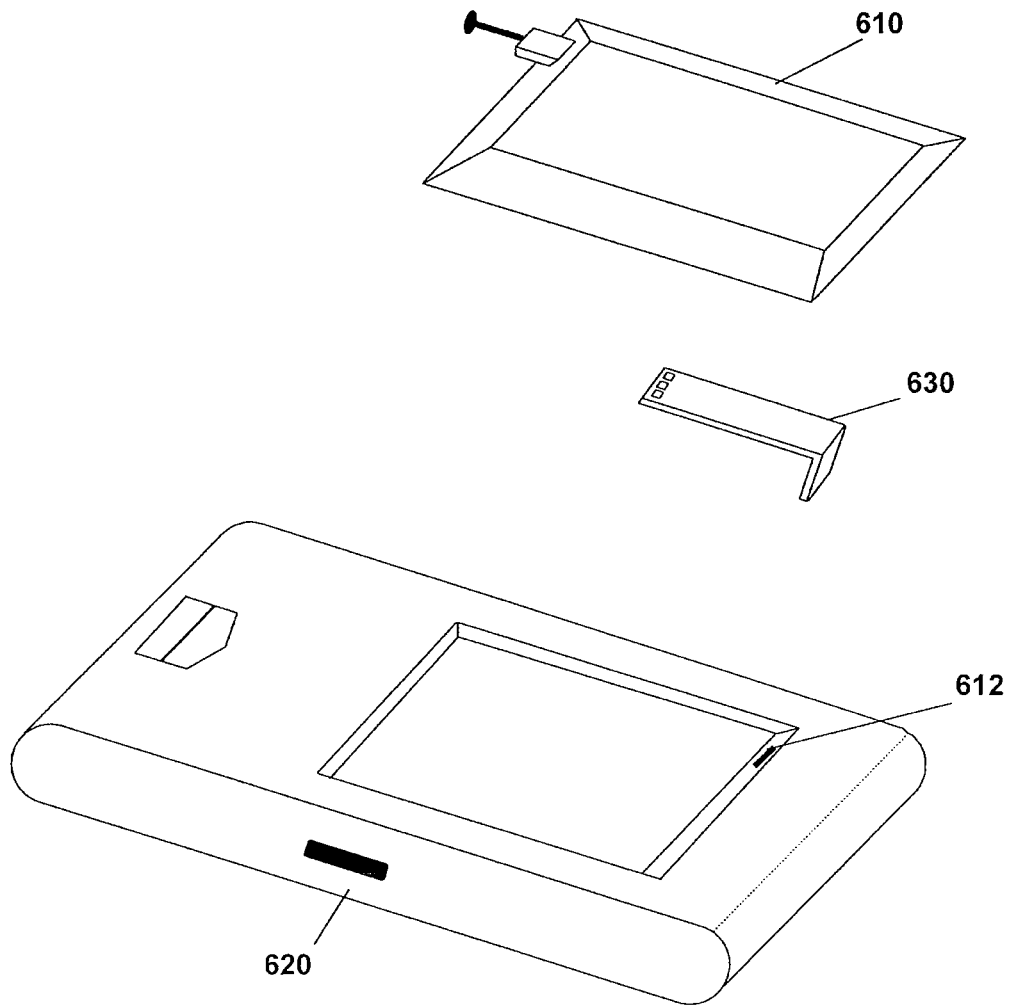
FIG. 6 is an exemplary backpack accessory and adapter to connect to a mobile device.

Reference is now made to FIG. 6. FIG. 6 illustrates an exemplary configuration for a backpack accessory. As will be seen, a mobile device 620 and a backpack accessory 610 are connected using an adapter 630 into the battery compartment 612 of mobile device 620.

In a further alternative embodiment, the backpack could be connected, rather than with a Bluetooth™ connection, with a module through the battery connector. As will be appreciated, the embodiment of FIG. 3 is modified by removing the Bluetooth™ chip from at least from the backpack accessory. The module in the present case can be either a physical connection or an over-the-air connection. The use of Bluetooth™ above therefore is not meant to be limiting.

The use of a module, via the battery connector, also provides for a means to determine authenticity of the battery through encryption of communications with the physical connection through the battery.

Figure 7:
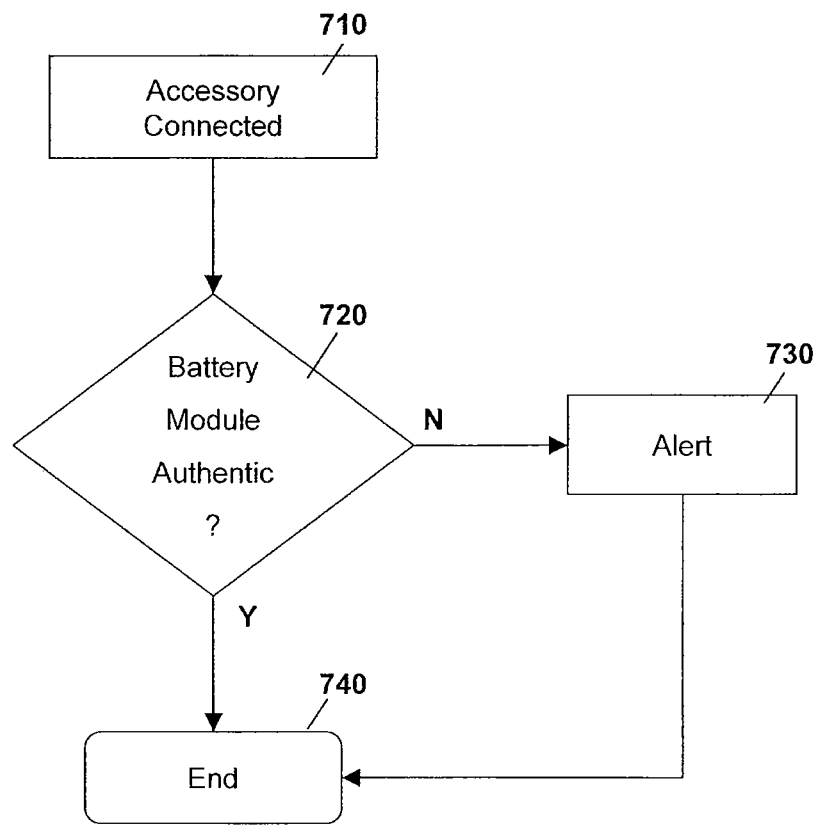
FIG. 7 is a flow diagram showing a process for checking whether a battery module is authentic.

Reference is now made to FIG. 7. In FIG. 7, the process starts at step 710 in which an accessory is connected through a battery module.

The process then proceeds to step 720 in which communication between the accessory and the mobile device is checked to determine whether the battery is authentic. As will be appreciated by those in the art, the communication through the battery module can be modified based on the battery utilized and this therefore allows the check of step 720 to be performed.

From step 720, if the battery module is determined not to be authentic, the process proceeds to step 730 in which an alert is provided to the user. As will be appreciate, an alert can take various forms including an audio, visual or other sensory alert.

From step 720 if the battery module is determined to be authentic, the process proceeds to step 740 and ends.

Application of a Backpack or Stand-Alone Accessory

As will be appreciated by those skilled in the art, the above benefits from the combination of a master mobile device combined with a slave accessory. Thus, for example, a network protocol device such as CDMA or GSM could have the added benefit of having an accessory added that would allow data, such as a UMTS backpack. Further, the device could benefit by having various protocols such as a CDMA or GMS device having an iDEN accessory where the iDEN accessory allows access to push-to-talk services.

Further, the above benefits from having a single interface for various different profiles. Thus, the user interface on the mobile device could be used for both.

The above further allows for the connection of different networks with a single user interface using a relay. The relay could be used for control of the networks.

As will be appreciated by those skilled in the art, various factors apply to the application of a radio accessory containing a radio to a mobile device. These are illustrated below.

User Interface

From FIGS. 3 and 4 above, in one embodiment the user interface is available only on the device. The call status display on the device should therefore reflect the status of the call whether the call is originating from the mobile device or is proceeding through the backpack accessory. This could include, for example, a call status display including the current speaker, volume level, among others. However, the user interface on the device should be synchronized to the backpack accessory radio module state. For example, if the backpack accessory is an iDEN accessory, the UI on the device should be synchronized with the iDEN accessory radio module state.

As will be appreciated by those in the art, in some embodiments, the radio accessory does not include a push-to-talk button and thus the radio accessory cannot fully function on its own without a host device. Further, in some embodiments, no microphone, speaker or earpiece is included with the radio accessory.

As will be appreciated by those skilled in the art, the pairing of the radio accessory with the mobile device provides the functionality to allow the user interface of the mobile device to be utilized.

In the case of a backpack accessory, the backpack accessory may not have a user interface at all and thus the establishment of a master/slave relationship between the mobile device and the accessory allows logic within the mobile device to determine when information should be conveyed to a user, either visually, through audio means or through other sensory means.

In the case of a stand alone accessory, once the stand alone accessory is paired with the mobile device, logic within the stand alone accessory could indicate that the user interface should be handled by the master mobile device and thus communications over a short range communications means such as Bluetooth™ could provide control information and data to allow the master mobile device to display or transmit user interface information.

As will be appreciated, if this stand alone accessory is not paired to a mobile device, logic within the stand alone accessory could indicate that the user interface on the stand alone accessory should be utilized.

Figure 15:
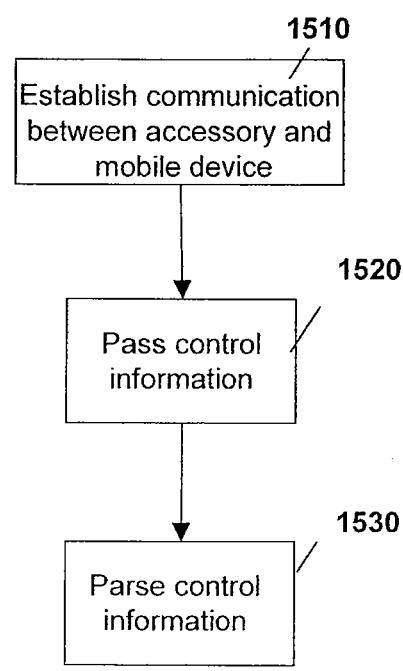
FIG. 15 is a process diagram illustrating the pairing of a radio accessory with a mobile device.

Reference is now made to FIG. 15. FIG. 15 illustrates the above. In particular, the process starts at step 1510 in which communicates is established between the accessory and the mobile device. This establishment of communications is over the short range communications paths of each of the mobile device and the accessory. In other words, step 1510 pairs the mobile device with the accessory.

The process then proceeds to step 1520. Based on a protocol for the short range communications between the mobile device and accessory, control information can be passed between the mobile device and the accessory.

The process then proceeds to step 1530 in which the control information is parsed based on the protocol utilized. If the mobile device is parsing control information, this information could include items such as the call status of the accessory, allowing the mobile device to set the audio path appropriately. Other control information could include the battery status if the accessory shares a battery with the mobile device. In further embodiments the control information could be utilized to set the user interface on the mobile device to display data from the accessory. Other possibilities would be evident to those skilled in the art having regard to the present disclosure.

User Interface/Audio Behavior

The description below utilizes the example of an iDEN push-to-talk radio accessory being added to a mobile device, such as a CDMA mobile device. This is, however, not meant to be limiting and the same principles could be applied to various backpack accessories.

In the case when no voice call is present on a CDMA mobile device, the user interface is dedicated to a push-to-talk call. The audio is switched and dedicated to the push-to-talk call through the Bluetooth™ link as illustrated in FIGS. 1, 3 and 4 above. Thus, the device is ready to respond to a push-to-talk call that is received through the backpack accessory.

Figure 8:
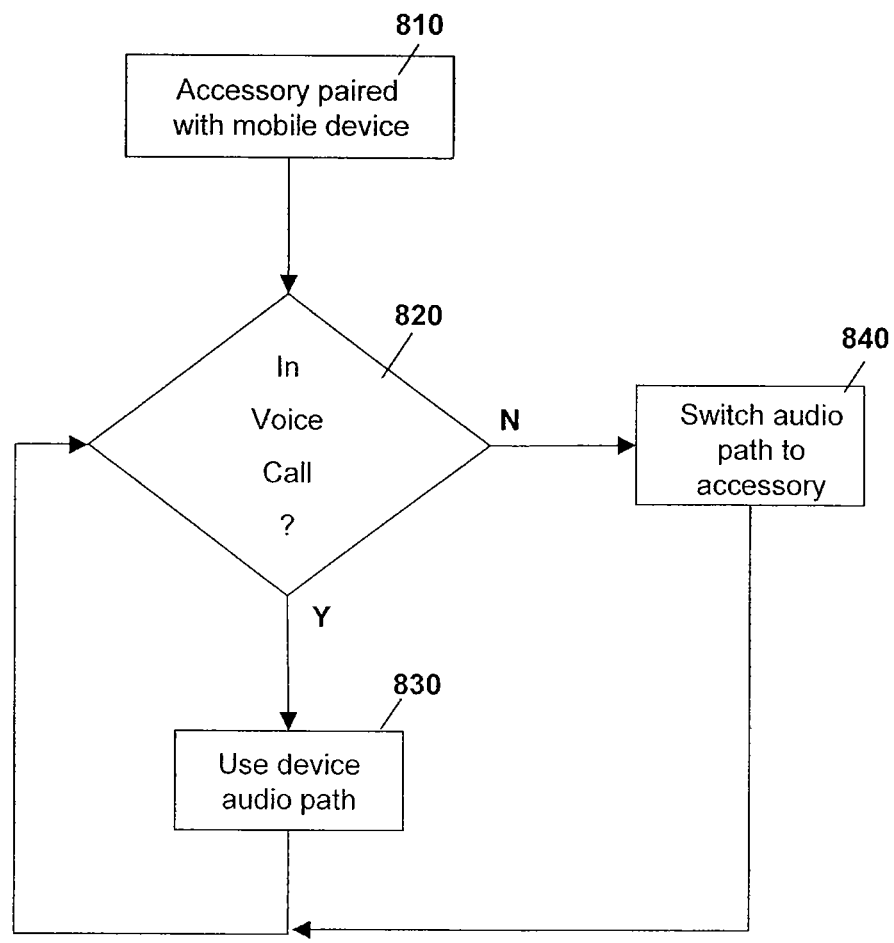
FIG. 8 is a flow diagram showing a process for switching the audio path depending on the functionality of the mobile device.

Reference is now made to FIG. 8. FIG. 8 illustrates a flow diagram showing the switching of the audio path. Specifically, the process starts at step 810 in which the accessory is paired with the mobile device. The process then proceeds to step 820 in which a check is made to determine whether the mobile device is in a voice call.

From step 820, if the device is in a voice call, the process proceeds to step 830 in which the audio path of the mobile device is used.

Alternatively, if the device is found not to be in a voice call in step 820, the audio path is switched to the accessory in step 840.

From step 830 and step 840 the process proceeds back to step 820 to continue checking whether the device is in a voice call.

As will be appreciated, the device utilizing the process of FIG. 8 maintains the audio path to the accessory to insure the device is ready to respond to a push-to-talk call that is received through the accessory.

In the case where the mobile device is already in a voice call through its radio technology, if an incoming push-to-talk call occurs, the voice call can be put on hold and the incoming push-to-talk call can be displayed on the user interface of the mobile device. The user interface screen may be split to show voice and push-to-talk calls on a single screen. The audio routing and path need to be switched to handle the incoming push-to-talk call. This is accomplished by passing call status information and other data from the accessory to the mobile device.

In a preferred embodiment, a buffer may be provided on the accessory module to store push-to-talk voice until audio routing and Bluetooth™ link are established. This could, for example, be a three to five second buffer.

In the case that the mobile device is already in a push-to-talk call through the radio accessory, an incoming voice call can result in various behavior by the mobile device. In a first instance, the incoming voice call can be rejected and directed to voice mail if applicable. In an alternative embodiment, a pop-up window may appear on the mobile device in a manner similar to call waiting and an in-band tone played. The in-band tone can be mixed with push-to-talk audio if required. This will alert the user to the incoming call and the user may choose to answer the voice call, thus ending the PTT call. Again, this logic requires the mobile device to be aware of the call status of the radio accessory.

Figure 9:
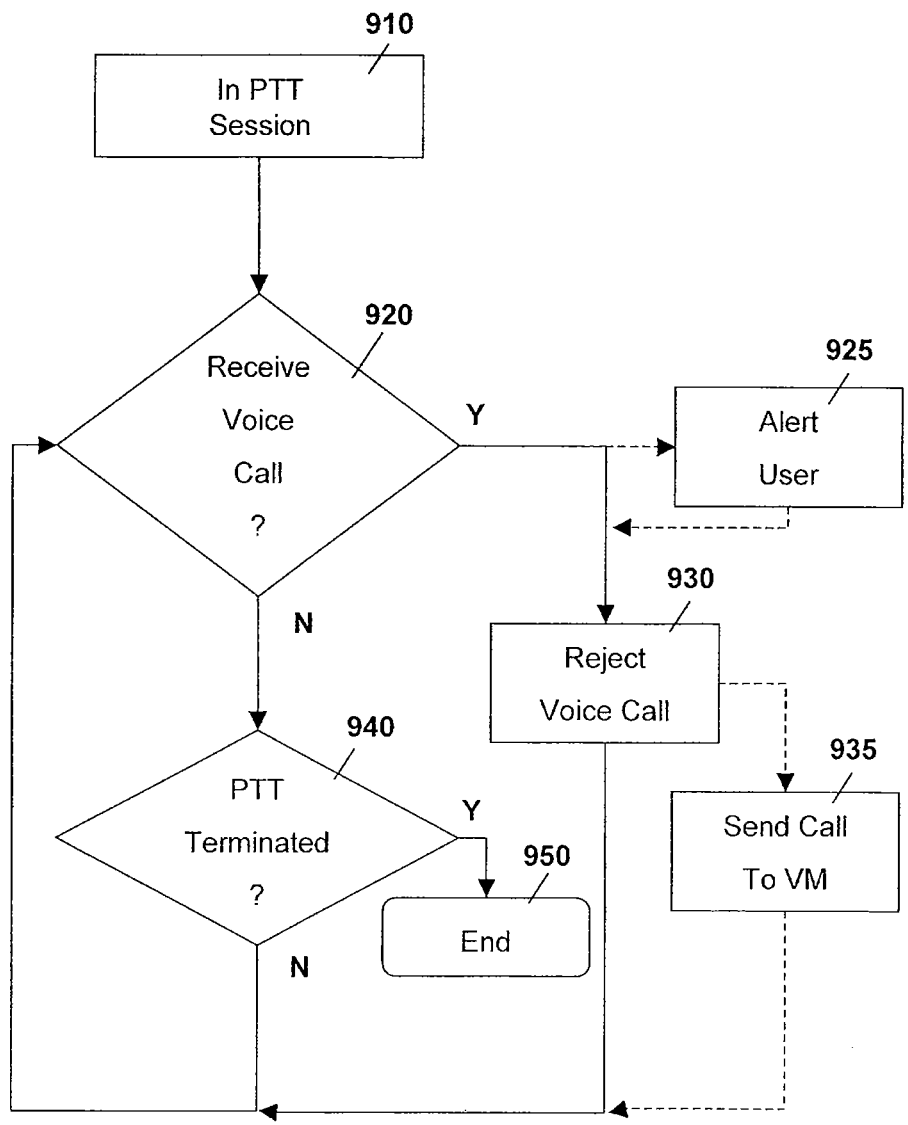
FIG. 9 is a flow diagram showing the blocking of a received voice call when a mobile device is in a PTT session.

Reference is now made to FIG. 9. In FIG. 9, the process starts at step 910 in which the paired mobile device and radio accessory are in a push-to-talk session. Call status and data are passed over the short range communications path. The process then proceeds to step 920 in which a voice call is received by the mobile device.

In a first embodiment, the process, if it is determined that a voice call is received at step 920, proceeds to step 930 in which the voice call is rejected. The process then proceeds to step 920 to continue monitoring whether a voice call is received.

From step 920 if a voice call is not received, the process proceeds to step 940 in which a check is made to determine whether the push-to-talk session has terminated. Again, this is accomplished through a short range communications protocol between the mobile device and the accessory. If yes, the process proceeds to step 950 and ends. Otherwise the process proceeds back to 920 in which it continues to monitor whether a voice call is received.

In alternative embodiments, from step 930 the process can proceed to step 935 in which the voice call is routed to voice mail. From step 935 the process could then proceed back to step 920.

In a further alternative embodiment, if a voice call is received in step 920, an alert 925 could be provided to a user.

The user would then have the option of proceeding to step 930 by rejecting the voice call or could interrupt the push-to-talk call.

As will be appreciated by those skilled in the art, if the user chooses to answer the incoming voice call and end the PTT call, audio routing needs to be done to route audio from the radio on the mobile device. This is done through control information being passed between the mobile device and radio accessory.

As will be further appreciated, the use of an iDEN radio accessory for push-to-talk functionality does not result in a contention for UI and audio with other applications such as e-mail, calendar, among others.

Contention with other audio related applications such as a media player, VAD (voice activating dialing), among others is handled by logic dictating that the PTT taking priority and the audio/UI being switched accordingly.

Figure 10:
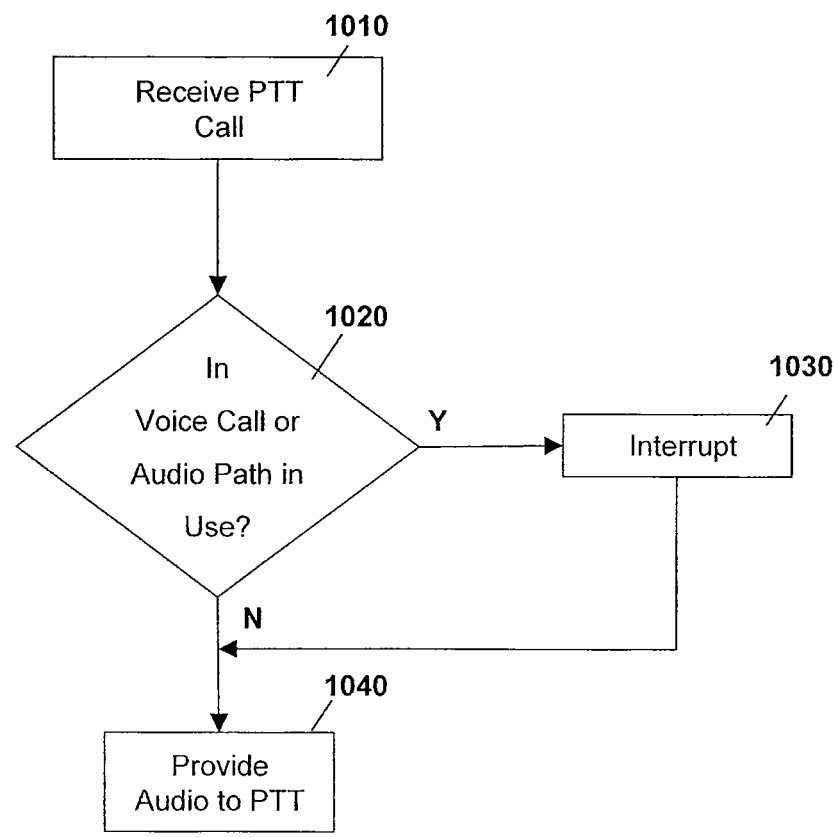
FIG. 10 is a flow diagram showing the interruption of a voice call or a process using the audio path upon receipt of a PTT call.

Reference is now made to FIG. 10. FIG. 10 illustrates a flow diagram in which a mobile device and accessory pairing receives a push-to-talk call at step 1010. This information is conveyed to the mobile device from the radio accessory utilizing the short range communications protocol.

The process then proceeds to step 1020 in which a check is made whether the mobile device is in a voice call or the audio path is already in use.

From step 1020, if the mobile device is in a voice call where the audio path is already in use, the process proceeds to step 1030 in which the voice call or audio path is interrupted. As will be appreciated, this frees the audio path for the push-to-talk call.

The process then proceeds, either from step 1030 or from step 1020 if the user was not in a voice call or the audio path is not in use, to step 1040 in which the audio path is assigned to the push-to-talk call.

Emergency handling, in a preferred embodiment, is handled by blocking or masking incoming PTT calls. Further, during an emergency callback mode, no outgoing PTT calls are allowed by the mobile device and masking of incoming PTT calls continues.

Figure 11:
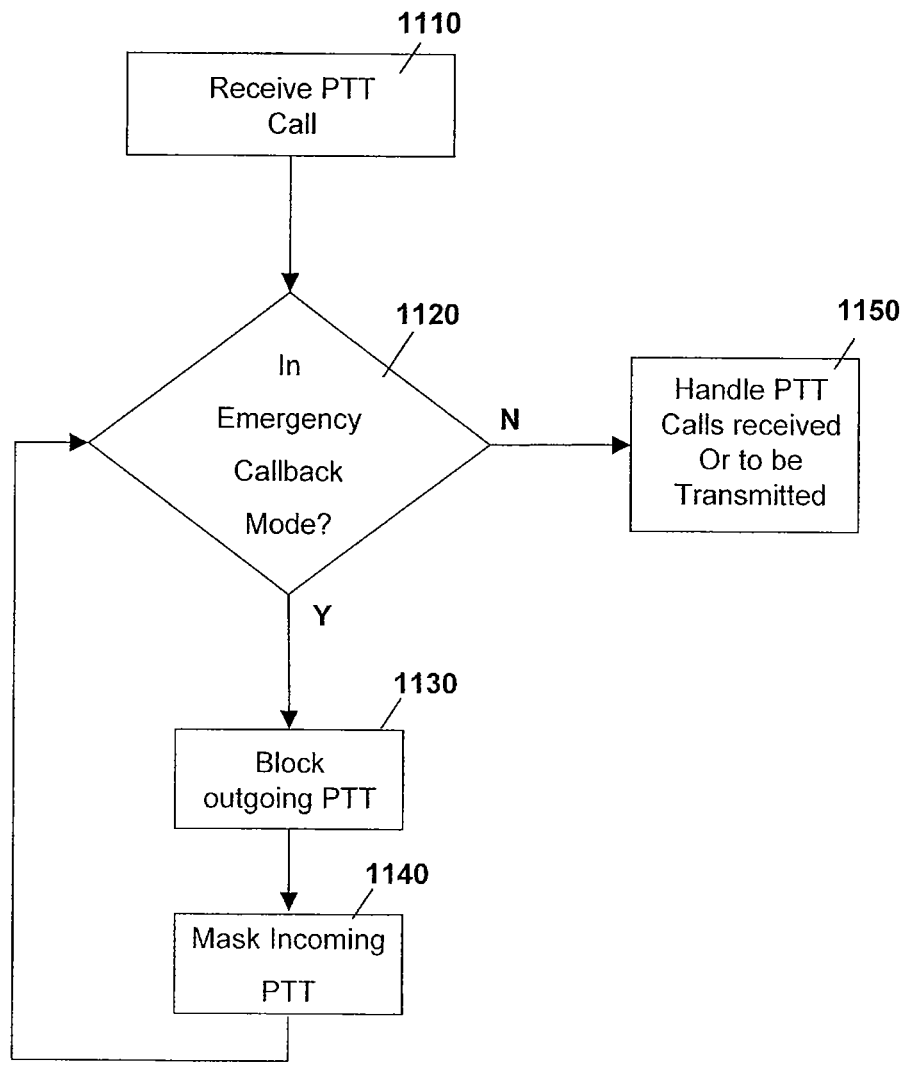
FIG. 11 is a flow diagram showing PTT call handling when the mobile device is in an emergency callback mode.

Reference is now made to FIG. 11. In FIG. 11, the process starts at step 1110 in which a push-to-talk call is received. This information is passed from the radio accessory to the mobile device. The process then proceeds to step 1120 in which a check is made to determine whether the mobile device is in an emergency callback mode. If yes, the process proceeds to step 1130 in which a block is put onto all outgoing push-to-talk calls. The process further proceeds to step 1140 in which a mask is placed on incoming push-to-talk calls to prevent these calls from interrupting the emergency callback mode. In the case of a stand-alone accessory, the stand-alone accessory needs to receive control information to mask incoming calls and block outgoing calls. The process then proceeds to step 1120 in which a check is made to determine whether the mobile device is still in emergency callback mode.

If the device is not in emergency callback mode in step 1120 the process proceeds to step 1150 in which any push-to-talk calls received or desired to be transmitted are handled.

The above is handled by a contention manager. The contention manager may be modified to turn on and off only if the PTT radio is on or off. Further, the contention manager could utilize a profile setting on the mobile device which allows a user to modify contention situations for the user's preferences. Such modification could, for example, include giving priority to voice calls over PTT calls. In a further embodiment, the contention manager could be turned on or off when an accessory is paired with the mobile device.

As indicated with reference to FIGS. 1 and 2 above, is one embodiment both the mobile device and the stand-alone accessory include a user interface. A call status display is included which provides information about the current speaker, the volume among others. The display screen on the accessory could be limited for example up to two lines to display only necessary information which could save battery resources.

A push-to-talk button could be available on both the device and on the stand-alone accessory when paired, synchronization logic exchanged between the devices would be applied to keep state machines on the device and the accessory synchronized.

In a further embodiment, an optional tethered push-to-talk headset could be attached to the mobile device. When tethered, the push-to-talk headset is attached to the device and the push-to-talk button stays between the tethered headset, mobile device and stand-alone accessory need to be synchronized.

In a preferred embodiment, a microphone and speaker or earpiece are available on the accessory unit.

Proximity Sensor

With a stand-alone device or a backpack device having its own battery, a proximity sensor could be implemented. Specifically, if a Bluetooth™ connection between the stand-alone device and the mobile device is broken, an alert could be sent to the user to notify the user that the Bluetooth™ connection is lost. Thus, for example, if a user leaves the mobile device in his or her vehicle and walks away from the vehicle while having a lapel-mounted accessory, the lapel-mounted accessory could alert the user that the mobile device has been left behind. This could be advantageous in that the mobile device is not inadvertently left behind.

Figure 12:
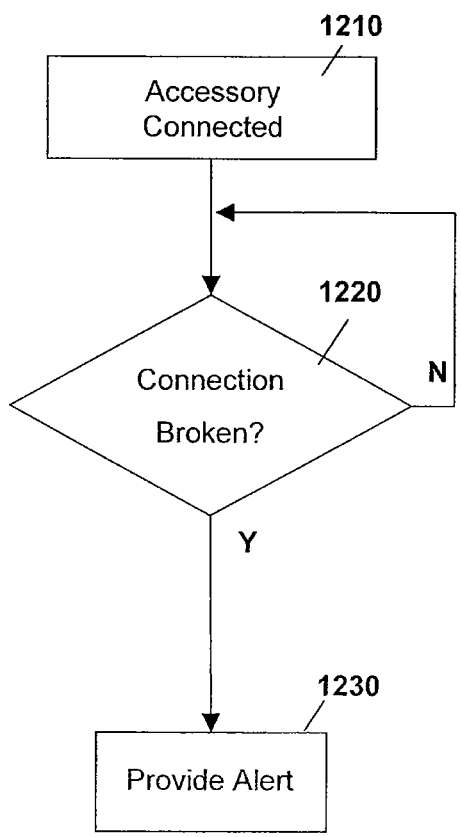
FIG. 12 is a flow diagram showing a process for providing an alert if a short range communication between a mobile device and an accessory is broken.

Reference is now made to FIG. 12. In FIG. 12 the process starts at step 1210 in which the accessory is connected. The process then proceeds to step 1220 in which a check is made to determine whether the connection is broken.

From step 1220 if the connection is not broken, the process continues to loop on step 1220 until the connection is broken. As will be appreciated by those in the art, the step in 1220 can be accomplished by an interrupt or periodic polling.

The process from step 1220 proceeds to step 1230 if the connection is broken. In step 1230 an alert is provided to the user that the short range communication connection is broken. As will be appreciated the alert could be an audio, visual or other sensory alert.

Host Pairings

For both the stand-alone accessory and for the backpack accessory, the accessory may take on a profile of the host mobile device. The profile could be transferred from the host device to the stand-alone accessory or backpack accessory, for example on pairing, and thus the stand-alone accessory or the backpack accessory do not need to be taught a profile.

Further, with the host pairing, a virtual number that is hidden from the user would be used as a hidden communication channel.

Switching PTT Session

A further option in the management of the audio path is to switch a PTT session to a phone session management. This would allow the carrying of profiles from one session to another. For example, when talking using the PTT iDEN accessory, a user may wish to switch a regular CDMA call. In this case, the number associated with the PTT session is remembered and the profile is also remembered. The process allows for the automatic connection of the CDMA call.

Group Chat

As will be appreciated by those skilled in the art, if the accessory is an iDEN radio accessory, the functionality allows push-to-talk to group chat. Thus, a push-to-talk group can go over a conference call on a CDMA network, for example, thereby tying various members on various networks together. The process combines the audio paths of the push-to-talk with the CDMA.

As will be further appreciated, the above could be implemented on an accessory that allows for family radio service (FRS) in addition to, or instead of, an iDEN accessory.

Figure 13:
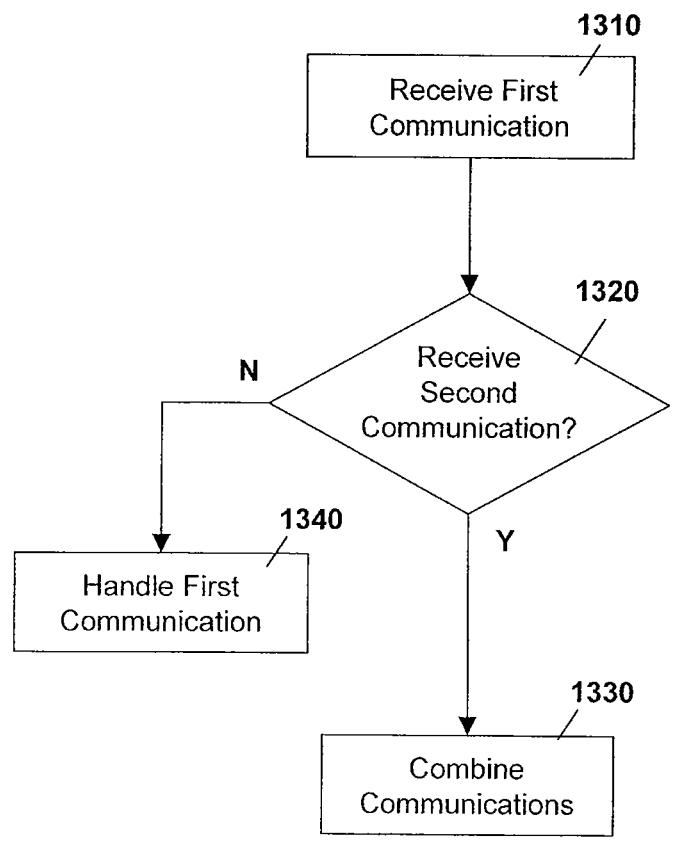
FIG. 13 is a flow diagram showing the combination of two communications.

The above is illustrated with regard to FIG. 13. In FIG. 13, the process starts at step 1310 in which a first communication is received. The process then proceeds to step 1320 in which a check is made to see whether a second communication exists. As will be appreciated, the second communication could pre-exist or be initiated upon the first connection being received.

If, in step 1320, a second communication exists, the process could proceed to step 1330 in which the two communications are combined. This could then result in a multi-mode communication existing. For example, a push-to-talk call could be transmitted to a CDMA network thereby providing a group chat.

From step 1320, if the second communication does not exist, then the process proceeds to step 1340 in which the first communication is dealt with.

Alert Functionality

The use of an accessory having a radio allows for ALERT to be transferred over either radio service. Thus, for example, when using an iDEN accessory, the iDEN ALERT could be used to indicate to a user that the user should check e-mail on a CDMA or other technology phone. This, therefore, provides push functionality for different technology to check e-mail where the push may come from the server. Other alerts are also possible and would be known to those skilled in the art.

In the above example, the server is attached to the iDEN phone and when an e-mail arrives, the server can provide a notification, automated short message server (SMS) to all parties when the phone is busy or not working.

Call Alert

A further embodiment includes when incoming PTT call is received, but before the Bluetooth link and audio connection is established. As will be appreciated, this could take 2 or 3 seconds. In this case the calling party could release the talk channel. To prevent this, the accessory could grab the talk channel and send an automated short voice note, suggesting to the far end calling party that "I am here and will respond to you in a second". This would prevent the calling party from hanging up before Bluetooth link and audio is established.

The mobile device discussed above could be any mobile device. One example of a mobile device is illustrated with reference to FIG. 14 below.

Figure 14:
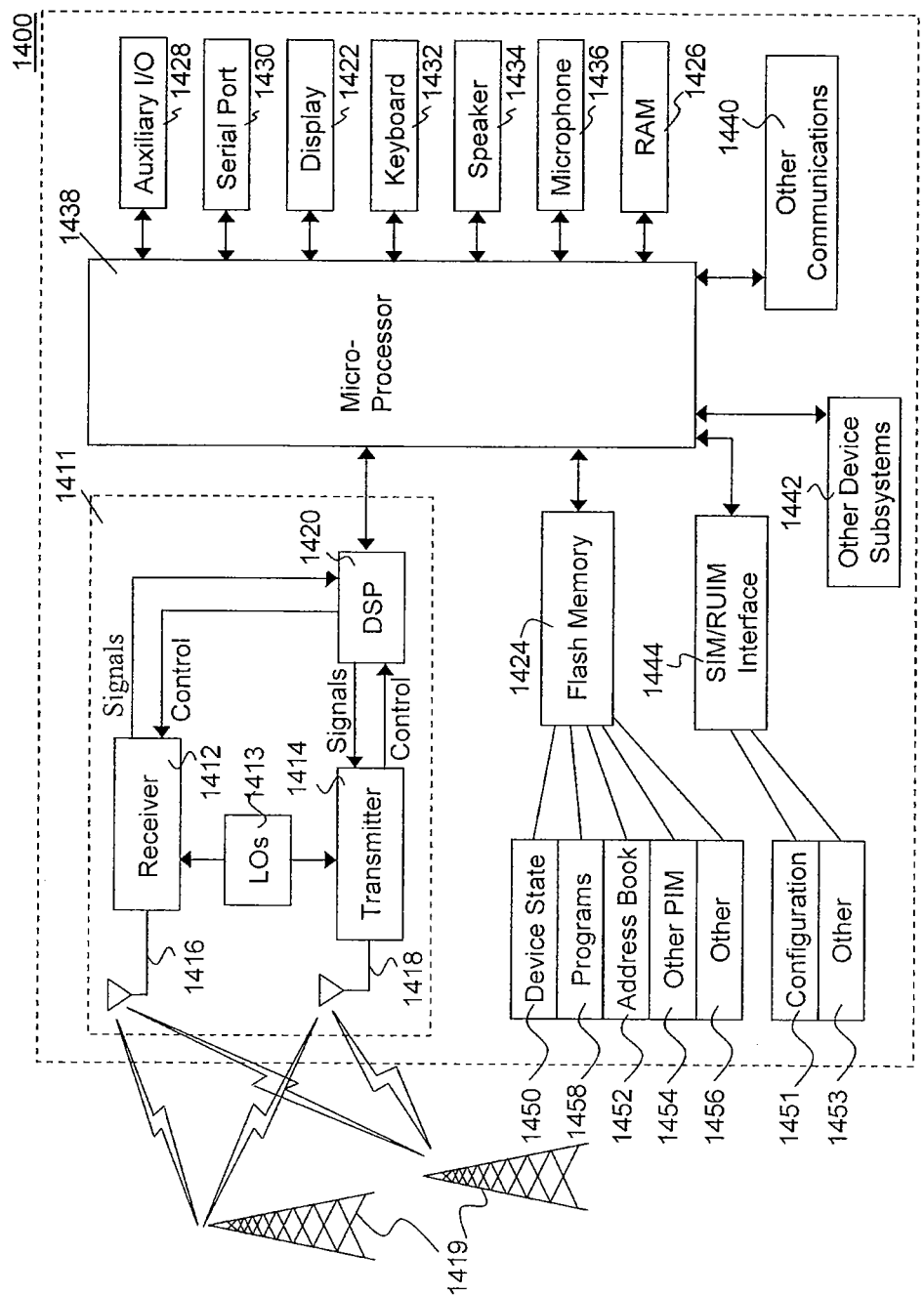
FIG. 14 is a block diagram illustrating an exemplary mobile device.

FIG. 14 is a block diagram illustrating a mobile device apt to be used with preferred embodiments of the apparatus and method of the present application. Mobile device 1400 is preferably a two-way wireless communication device having at least voice and data communication capabilities. Mobile device 1400 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile device 1400 is enabled for two-way communication, it will incorporate a communication subsystem 1411, including both a receiver 1412 and a transmitter 1414, as well as associated components such as one or more, preferably embedded or internal, antenna elements 1416 and 1418, local oscillators (LOs) 1413, and a processing module such as a digital signal processor (DSP) 1420. As will be apparent to those skilled in the field of communications, the particular design of the communication subsystem 1411 will be dependent upon the communication network in which the device is intended to operate.

Network access requirements will also vary depending upon the type of network 1419. In some CDMA networks, for example, network access is associated with a subscriber or user of mobile device 1400. A CDMA mobile device may require a removable user identity module (RUIM) or a subscriber identity module (SIM) card in order to operate on a CDMA network. The SIM/RUIM interface 1444 is normally similar to a card-slot into which a SIM/RUIM card can be inserted and ejected like a diskette or PCMCIA card. The SIM/RUIM card can have approximately 64K of memory and hold many key configuration 1451, and other information 1453 such as identification, and subscriber related information.

When required network registration or activation procedures have been completed, mobile device 1400 may send and receive communication signals over the network 1419. As illustrated in FIG. 14, network 1419 can consist of multiple base stations communicating with the mobile device. For example, in a hybrid CDMA 1x EVDO system, a CDMA base station and an EVDO base station communicate with the mobile device and the mobile device is connected to both simultaneously. The EVDO and CDMA 1x base stations use different paging slots to communicate with the mobile device.

Signals received by antenna 1416 through communication network 1419 are input to receiver 1412, which may perform such common receiver functions as signal amplification, frequency down conversion, filtering, channel selection and the like, and in the example system shown in FIG. 14, analog to digital (A/D) conversion. A/D conversion of a received signal allows more complex communication functions such as demodulation and decoding to be performed in the DSP 1420. In a similar manner, signals to be transmitted are processed, including modulation and encoding for example, by DSP 1420 and input to transmitter 1414 for digital to analog conversion, frequency up conversion, filtering, amplification and transmission over the communication network 1419 via antenna 1418. DSP 1420 not only processes communication signals, but also provides for receiver and transmitter control. For example, the gains applied to communication signals in receiver 1412 and transmitter 1414 may be adaptively controlled through automatic gain control algorithms implemented in DSP 1420.

Mobile device 1400 preferably includes a microprocessor 1438 which controls the overall operation of the device. Communication functions, including at least data and voice communications, are performed through communication subsystem 511. Microprocessor 1438 also interacts with further device subsystems such as the display 1422, flash memory 1424, random access memory (RAM) 526, auxiliary input/output (I/O) subsystems 1428, serial port 1430, one or more keyboards or keypads 1432, speaker 1434, microphone 1436, other communication subsystem 1440 such as a short-range communications subsystem and any other device subsystems generally designated as 1442. Serial port 1430 could include a USB port or other port known to those in the art.

Some of the subsystems shown in FIG. 14 perform communication-related functions, whereas other subsystems may provide "resident" or on-device functions. Notably, some subsystems, such as keyboard 1432 and display 1422, for example, may be used for both communication-related functions, such as entering a text message for transmission over a communication network, and device-resident functions such as a calculator or task list.

Operating system software used by the microprocessor 1438 is preferably stored in a persistent store such as flash memory 1424, which may instead be a read-only memory (ROM) or similar storage element (not shown). Those skilled in the art will appreciate that the operating system, specific device applications, or parts thereof, may be temporarily loaded into a volatile memory such as RAM 1426. Received communication signals may also be stored in RAM 1426.

As shown, flash memory 1424 can be segregated into different areas for both computer programs 1458 and program data storage 1450, 1452, 1454 and 1456. These different storage types indicate that each program can allocate a portion of flash memory 1424 for their own data storage requirements. Various collections are also stored in flash memory 1424. Microprocessor 1438, in addition to its operating system functions, preferably enables execution of software applications on the mobile device. A predetermined set of applications that control basic operations, including at least data and voice communication applications for example, will normally be installed on mobile device 1400 during manufacturing. Other applications could be installed subsequently or dynamically.

A preferred software application may be a personal information manager (PIM) application having the ability to organize and manage data items relating to the user of the mobile device such as, but not limited to, e-mail, calendar events, voice mails, appointments, and task items. Naturally, one or more memory stores would be available on the mobile device to facilitate storage of PIM data items. Such PIM application would preferably have the ability to send and receive data items, via the wireless network 1419. In a preferred embodiment, the PIM data items are seamlessly integrated, synchronized and updated, via the wireless network 1419, with the mobile device user's corresponding data items stored or associated with a host computer system. Further applications may also be loaded onto the mobile device 1400 through the network 1419, an auxiliary I/O subsystem 1428, serial port 1430, short-range communications subsystem 1440 or any other suitable subsystem 1442, and installed by a user in the RAM 1426 or preferably a non-volatile store (not shown) for execution by the microprocessor 1438. Such flexibility in application installation increases the functionality of the device and may provide enhanced on-device functions, communication-related functions, or both. For example, secure communication applications may enable electronic commerce functions and other such financial transactions to be performed using the mobile device 1400.

In a data communication mode, a received signal such as a text message or web page download will be processed by the communication subsystem 1411 and input to the microprocessor 1438, which preferably further processes the received signal for output to the display 1422, or alternatively to an auxiliary I/O device 1428.

A user of mobile device 1400 may also compose data items such as email messages for example, using the keyboard 1432, which is preferably a complete alphanumeric keyboard or telephone-type keypad, in conjunction with the display 1422 and possibly an auxiliary I/O device 1428. Such composed items may then be transmitted over a communication network through the communication subsystem 1411.

For voice communications, overall operation of mobile device 1400 is similar, except that received signals would preferably be output to a speaker 1434 and signals for transmission would be generated by a microphone 1436. Alternative voice or audio I/O subsystems, such as a voice message recording subsystem, may also be implemented on mobile device 1400. Although voice or audio signal output is preferably accomplished primarily through the speaker 1434, display 1422 may also be used to provide an indication of the identity of a calling party, the duration of a voice call, or other voice call related information for example.

Serial port 1430 in FIG. 14 would normally be implemented in a personal digital assistant (PDA)-type mobile device for which synchronization with a user's desktop computer (not shown) may be desirable, but is an optional device component. Such a port 1430 would enable a user to set preferences through an external device or software application and would extend the capabilities of mobile device 1400 by providing for information or software downloads to mobile device 1400 other than through a wireless communication network. The alternate download path may for example be used to load an encryption key onto the device through a direct and thus reliable and trusted connection to thereby enable secure device communication. As will be appreciated by those skilled in the art, serial port 1430 can further be used to connect the mobile device to a computer to act as a modem.

Other communications subsystems 1440, such as a short-range communications subsystem, is a further optional component which may provide for communication between mobile device 1400 and different systems or devices, which need not necessarily be similar devices. For example, the subsystem 1440 may include an infrared device and associated circuits and components or a Bluetooth™ communication module to provide for communication with similarly enabled systems and devices.

The embodiments described herein are examples of structures, systems or methods having elements corresponding to elements of the techniques of this disclosure. This disclosure may enable those skilled in the art to make and use embodiments having alternative elements that likewise correspond to the elements or the techniques of this disclosure. The intended scope of the techniques of this disclosure thus includes other structures, systems or methods that do not defer from the techniques of the disclosure as described herein, and further includes other structures, systems or methods within substantial differences from the techniques of this disclosure as described herein.

The invention claimed is:

1. A system for enhancing functionality of a mobile device comprising:
 the mobile device, wherein the mobile device includes:
  a first radio subsystem for communicating with a first radio network;
  a first processor adapted to interact with the first radio subsystem;
  a user interface;
  a first short range communications system; and
  a battery adapted to power the mobile device; and
 a radio accessory adapted to be paired with and communicate with the mobile device, the radio accessory including:
  at least one second processor;
  a second radio subsystem communicating with the at least one second processor, the second radio subsystem adapted to independently communicate with a second radio network;
  a second short range communications system adapted to communicate with the first short range communications system of the mobile device,
 wherein when paired:
  the radio accessory and mobile device are adapted to establish a master-slave relationship by passing control information between the mobile device and the radio accessory, and the mobile device and radio accessory are able to communicate on their respective first and second radio networks;
  the mobile device including first logic to determine when information should be conveyed at the mobile device user interface when the radio accessory and mobile device have established said master-slave relationship; and
  the radio accessory including second logic to, indicate whether the user interface should be handled by the mobile device when the radio accessory and mobile device have established said master-slave relationship.

2. The system of claim 1, wherein the second short range communications system in the radio accessory is a Bluetooth™ communication system.

3. The system of claim 1, wherein the second short range communications system of the radio accessory is a physical communication means.

4. The system of claim 3, wherein the physical communication means communicates through a battery connector.

5. The system of claim 4, wherein the battery is authenticated through encryption on the physical connection.

6. The system of claim 1, wherein the radio accessory is physically connected to the mobile device through a battery connector.

7. The system of claim 1, wherein the radio accessory is incorporated into a holster for the mobile device.

8. The system of claim 1, wherein the radio accessory includes a user interface.

9. The system of claim 8, wherein the user interface of the radio accessory comprises at least one of a screen, a speaker, a microphone, a button, a keypad and a keyboard.

10. The system of claim 1, wherein the second radio subsystem of the radio accessory is an integrated digital enhanced network (iDEN) subsystem.

11. The system of claim 10, wherein the radio accessory is a low latency push-to-talk device.

12. The system of claim 1, where in the radio accessory is a family radio service device.

13. The system of claim 1, wherein the radio accessory is weatherproofed.

14. The system of claim 1, wherein the radio accessory includes a radio processor and a control processor.

15. The system of claim 1, wherein the radio accessory includes an audio CODEC (coder-decoder) integrated circuit chip.

16. The system of claim 1, wherein the radio accessory includes a buffer.

17. The system of claim 16, wherein the buffer is adapted to buffer voice until communication is established between the radio accessory and the mobile device.

18. The system of claim 1, wherein the radio accessory is a backpack accessory or a stand-alone accessory.

\* \* \* \* \*